US012811633B2

(12) United States Patent
Norouzi et al.

(10) Patent No.: US 12,811,633 B2
(45) Date of Patent: Nov. 24, 2026

(54) ULTRA-HIGH RELIABILITY LINK ADAPTATION EXTENSION TO SUPPORT UNEQUAL MODULATION

(71) Applicant: HUAWEI TECHNOLOGIES CO., LTD., Shenzhen (CN)

(72) Inventors: Sara Norouzi, Kanata (CA); Jung Hoon Suh, Kanata (CA); Yan Xin, Kanata (CA); Osama Aboul-Magd, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 18/897,696

(22) Filed: Sep. 26, 2024

(65) Prior Publication Data

US 2025/0300702 A1 Sep. 25, 2025

Related U.S. Application Data

(60) Provisional application No. 63/568,893, filed on Mar. 22, 2024.

(51) Int. Cl.
*H04B 7/0452* (2017.01)
*H04W 28/06* (2009.01)
(Continued)

(52) U.S. Cl.
CPC ........ *H04B 7/0452* (2013.01); *H04W 28/065* (2013.01); *H04W 72/51* (2023.01); *H04B 7/046* (2013.01); *H04W 72/046* (2013.01)

(58) Field of Classification Search
CPC ..... H04B 7/0452; H04B 7/046; H04W 72/51; H04W 28/065; H04W 72/046
(Continued)

(56) References Cited

U.S. PATENT DOCUMENTS

2012/0155415 A1 6/2012 Seok
2021/0028839 A1 1/2021 Oteri et al.
(Continued)

FOREIGN PATENT DOCUMENTS

WO 2023249311 A1 12/2023

OTHER PUBLICATIONS

Cao et al., IEEE 802.11-24/0016r1, mimo-rvr-enhancement-with-unequal-modulation, Jan. 12, 2024, 27 pages.
(Continued)

*Primary Examiner* — Anthony Mejia

(57) ABSTRACT

Methods and apparatus for indicating unequal modulation (UEQM) parameters for spatial streams between antennae of multiple input, multiple output (MIMO) communication
(Continued)

systems are provided. Embodiments enable UEQM by introducing a high-throughput control (HTC) extension field in the medium access control header of data frames. The HTC extension field can include modulation parameters for each of a plurality of spatial streams as well as link adaptation parameters for the communication system. In some embodiments, changes in modulation parameters between consecutive spatial streams are used to indicate the modulation parameters for each spatial stream. In some other embodiments, indices for common combinations of modulations are used to indicate the respective modulation parameters for each spatial stream. UEQM enabled by embodiments may provide an improved throughput and goodput to MIMO communication systems.

20 Claims, 13 Drawing Sheets

(51) Int. Cl.

| | |
|---|---|
| ***H04W 72/51*** | (2023.01) |
| *H04B 7/0456* | (2017.01) |
| *H04W 72/044* | (2023.01) |

(58) Field of Classification Search

USPC .......................................................... 370/329

See application file for complete search history.

(56) References Cited

U.S. PATENT DOCUMENTS

| | | | |
|---|---|---|---|
| 2024/0022347 | A1 | 1/2024 | Song et al. |
| 2024/0292254 | A1 | 8/2024 | Chun et al. |
| 2025/0373715 | A1 | 12/2025 | Chun et al. |

OTHER PUBLICATIONS

Chen et al., IEEE 802.11-24/0113r1, unequal-modulation-in-mimo-txbf-in-11bn, Jan. 15, 2024, 13 pages.

Porat et al., IEEE 802.11-24/0117r1, improved-transmit-MIMO-beamforming-with-ueqm, Jan. 18, 2024, 9 pages.

Song et al., IEEE 802.11-24/0176r1, unequal-modulation-over-spatial-streams, Jan. 18, 2024, 10 pages.

Lee et al., IEEE 802.11-21/0102r5, considerations on capabilities and operation Mode: MU-MIMO, Jan. 18, 2021, 21 pages.

IEEE Draft Standard for Information technology—Telecommunications and information exchange between systems Local and metropolitan area networks—Specific requirements—Part 11: Wireless LAN Medium Access Control (MAC) and Physical Layer (PHY) Specifications Amendment: Enhancements for Extremely High Throughput (EHT), in IEEE P802.11be/D5.0, Nov. 2023 , vol., No., pp. 1-1045.

Sara Norouzi et al: "HTC Extension for UHR Link Adaptation to Support UEQ-MCS/UEQM", Jul. 2024, doc.: IEEE 802.11-24/1216r0, total 16 pages.

ULTRA-HIGH RELIABILITY LINK ADAPTATION EXTENSION TO SUPPORT UNEQUAL MODULATION

CROSS-REFERENCE TO RELATED APPLICATIONS

This application claims the benefit of priority to U.S. provisional patent application Ser. No. 63/568,893 filed on Mar. 22, 2024, the content of which is hereby incorporated by reference in its entirety.

FIELD OF THE INVENTION

The present invention pertains to communication links and in particular to methods and apparatus for multiple-input, multiple output communication.

BACKGROUND

Multiple antennas can be used at each of a transmitter and a receiver in a technological strategy known as multiple-input, multiple-output (MIMO) to improve wireless communication between the transmitter and receiver. MIMO can enhance the data rate, reliability, and spectral efficiency of the wireless communications. MIMO techniques can include: spatial multiplexing, wherein the multiple antennas of the transmitter simultaneously and independently transmit separately coded data streams; spatial diversity, wherein a same data stream is transmitted from the multiple antennas of the transmitter to improve the reliability of transmission; and beamforming, wherein the amplitude and phase of data streams transmitted from each antenna are adjusted to direct and steer the transmission towards the antennas of the receiver.

MIMO transmissions can comprise multiple spatial streams, each of which may experience a different channel quality. This results in imbalances in signal-to-noise across the spatial streams that can limit the throughput of transmissions. Unequal modulation (UEQM), in which one encoder and different modulations are used for each spatial stream, has been proposed to address this limitation. However, there is a need for methods and apparatus for directing antennas to implement UEQM.

Therefore, there is a need for methods and apparatus for enabling UEQM that obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide methods and apparatus for indicating UEQM parameters.

A first aspect of the present disclosure is to provide a method for providing a plurality of UEQM parameters for each of a plurality of antennae for transmission of a physical layer protocol data unit (PPDU) by one or more respective spatial streams. The method may comprise: preparing, for the PPDU, a medium access control (MAC) header including a high-throughput (HT) control field having a control sub-field, with the control sub-field including a control identifier (ID); setting the control ID to define, in the MAC header, a HT control (HTC) extension having a plurality of bits; indicating, by a set of bits of the plurality of bits, an HTC extension type; and indicating, by one or more groups of bits of the plurality of bits, one or more UEQM parameters from among the plurality of UEQM parameters in accordance with the HTC extension type, with each of the one or more groups of bits of the plurality of bits being distinct from each other and from the set of bits, and with each of the one or more UEQM parameters defining a respective modulation scheme for at least one spatial stream of the one or more respective spatial streams of the plurality of antennae.

In some embodiments of the first aspect, indicating, by the one or more groups of the plurality of bits, the one or more UEQM parameters from among the plurality of UEQM parameters in accordance with the HTC extension type may include indicating by the respective one or more groups of bits of the plurality of bits, a transmitter beamforming parameter for single-user multiple input multiple output communication (MIMO), a number of spatial streams for multiple-user MIMO communication, an ultra-high-reliability (UHR) modulation scheme for multiple-user MIMO communication, and/or an extremely-high-throughput modulation scheme for multiple-user MIMO communication.

In some embodiments of the first aspect, indicating by the set of bits of the plurality of bits, the HTC extension type may include indicating, by the set of bits of the plurality of bits, a UHR link adaptation extension type. In some of these embodiments, the one or more UEQM parameters may be a first grouping of one or more UEQM parameters, and the control sub-field may further include control information having an additional plurality of bits. In these embodiments, the method may further comprise indicating, by the additional plurality of bits of the control information, a second grouping of one or more UEQM parameters from among the plurality of UEQM parameters, with the second grouping of one or more UEQM parameters defining a modulation scheme for a main spatial stream from among the one or more respective spatial streams of each antenna of the plurality of antennae. In some of these embodiments, indicating, by the one or more groups of bits of the plurality of bits, the one or more UEQM parameters from among the plurality of UEQM parameters in accordance with the HTC extension may include indicating, by a respective one or more groups of bits of the plurality of bits, the respective modulation scheme for each spatial stream of a set of spatial streams from among the one or more spatial streams, with the set of spatial streams excluding the main spatial stream. In some of other embodiments, each of the one or more UEQM parameters of the first grouping of one or more UEQM parameters may define the respective modulation scheme by a respective delta modulation, with each delta modulation defining a respective difference comprised between the respective modulation scheme and a respective one other modulation scheme defined by a respective other UEQM parameter of the first grouping of one or more UEQM parameters or by the second grouping of one or more UEQM parameters. In some of these embodiments, the respective spatial streams for the respective modulation scheme and the respective one other modulation scheme are consecutive. In some other embodiments, the method may further comprise indicating, by a supplemental set of bits of the plurality of bits, one or more multi-user multiple-input multiple-output (MU-MIMO) LA parameters. In some other embodiments, for each delta modulation being non-zero, the respective delta modulation may be indicated by a respective one of the one or more groups of bits of the plurality of bits, with the respective one group of bits being a bit having a value of 1 followed by three bits each having a respective value depending from the respective delta modulation. In some of these embodiments, for each delta modulation being zero, the respective delta modulation may be indicated by a respective one of the one or more groups of bits of the plurality of bits, the respective one of the one or more groups of bits being a group of bits that have a value of zero. In some other embodiments, each spatial stream of the one or more respective spatial streams of the plurality of antennae may have associated thereto a respective one or more singular values representing a respective one or more channel coefficients. In these embodiments, at least one of the respective one or more singular values of the main spatial stream may be a largest singular value among the respective one or more singular values of the one or more respective spatial streams of the plurality of antennae.

In some embodiments of the first aspect, the one or more UEQM parameters may be a first grouping of one or more UEQM parameters and the control sub-field may further include control information having an additional plurality of bits. The method may further comprise indicating, by the additional plurality of bits of the control information, a second grouping of one or more UEQM parameters from among the plurality of UEQM parameters, with the second grouping of one or more UEQM parameters defining the respective modulation scheme for the at least one spatial stream of the plurality of antennae by a pre-determined index. In some of these embodiments, the second grouping of one or more UEQM parameters may define the respective modulation scheme for the at least one spatial stream of the plurality of antennae by the pre-determined index and a number of spatial streams corresponding to the one or more respective spatial streams of the plurality of antennae.

In some embodiments of the first aspect, each of the one or more UEQM parameters defines the respective modulation scheme for a respective one spatial stream of the one or more respective spatial streams of the plurality of antennae.

A second aspect of the present disclosure is to provide an electronic device comprising a processor coupled to tangible, non-transitory processor-readable memory having stored thereon instructions to be executed by the processor to implement a method comprising: preparing, for a PPDU, a MAC header including a HT control field having a control sub-field, with the control sub-field including a control ID; setting the control ID to define, in the MAC header, a HTC extension having a plurality of bits; indicating, by a set of bits of the plurality of bits, an HTC extension type; and indicating, by one or more groups of bits of the plurality of bits, one or more UEQM parameters in accordance with the HTC extension type, with each of the one or more groups of bits of the plurality of bits being distinct from each other and from the set of bits, and with each of the one or more UEQM parameters defining a respective modulation scheme for at least one spatial stream of one or more respective spatial streams of each of a plurality of antennae configured to transmit the PPDU.

Embodiments of the present disclosure may facilitate UEQM by providing methods and apparatus for communicating different modulation schemes for spatial streams of antennae used to transmit a data message. Embodiments may enable improvements in the signal-to-noise of transmissions sent through MIMO systems.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

To enable UEQM in MIMO communication systems, embodiments of the present disclosure are generally directed towards providing methods and apparatus for communicating UEQM parameters to each antenna of a MIMO communication system. In embodiments, a high-throughput control (HTC) extension field may be introduced to the medium access control (MAC) header of the physical protocol data units (PPDUs) that are used for transmitting data in the communication system. The HTC extension field may define the modulation and coding system (MCS) for each spatial stream of each antenna. In addition, in some embodiments, the MCS for a main stream among the spatial streams may be defined by control information of the high-throughput (HT) control field of the MAC header. In some embodiments, the MCS for each spatial stream may be defined by a change in modulation, i.e., a delta modulation, with respect to the MCS of another, higher order spatial stream. In some embodiments, link adaptation (LA) parameters may further be defined by the HTC extension field.

The present disclosure sets forth various embodiments via the use of block diagrams, flowcharts, and examples. Insofar as such block diagrams, flowcharts, and examples contain one or more functions and/or operations, it will be understood by a person skilled in the art that each function and/or operation within such block diagrams, flowcharts, and examples can be implemented, individually or collectively, by a wide range of hardware, software, firmware, or combination thereof. As used herein, the term "about" should be read as including variation from the nominal value, for example, a +/−10% variation from the nominal value. It is to be understood that such a variation is always included in a given value provided herein, whether or not it is specifically referred to. The terms in each of the following sets may be used interchangeably throughout the disclosure: "modulation and coding system" and "modulation scheme".

Figure 1A:
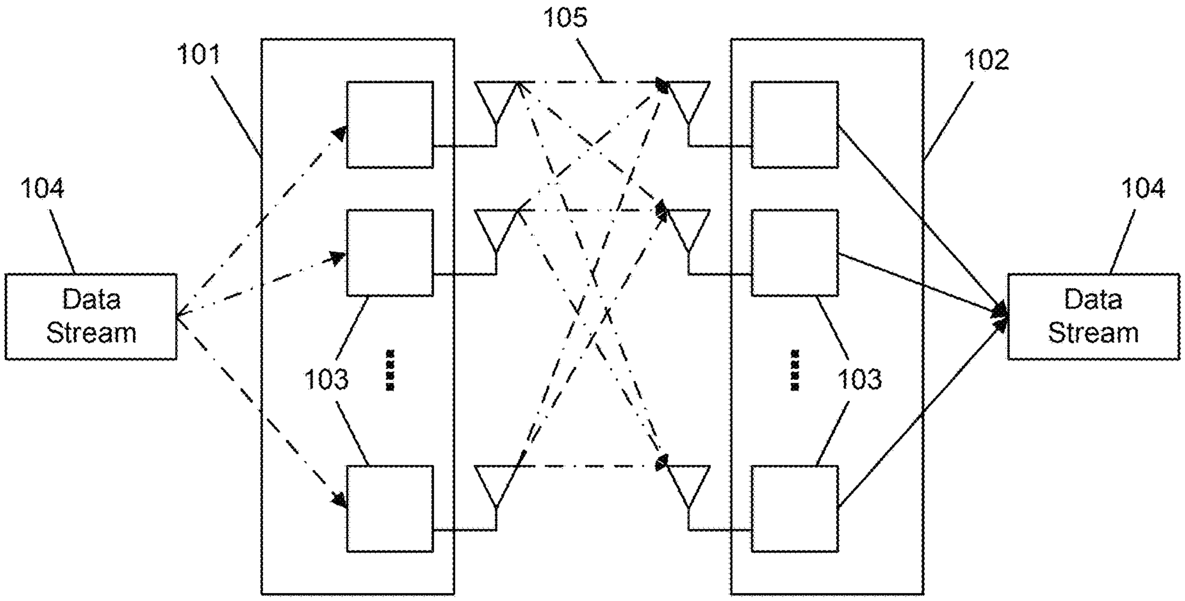
FIG. 1A (PRIOR ART)
FIG. 1A shows an example of spatial multiplexing in a MIMO communication system.

FIG. 1A shows an example of spatial multiplexing in a MIMO communication system. The MIMO communication system comprises a transmitter 101 in wireless communication with a receiver 102. Each of the transmitter 101 and receiver 102 have a respective plurality of antennae 103. The transmitter 101 is configured to receive a data stream 104 and send the data of the data stream 104 to the receiver 102 through a plurality of spatial streams 105 between the respective pluralities of antennae 103 of the transmitter 101 and receiver 102. With spatial multiplexing, each antenna 103 of the transmitter 101 may have an independent and separately coded spatial stream 105 with each antenna 103 of the receiver 102. In FIG. 1A, spatial multiplexing of the spatial streams 105 is depicted by the dot-dash, dot-dot-dash, and dot-dash-dash lines between antennae 103.

Figure 1B:
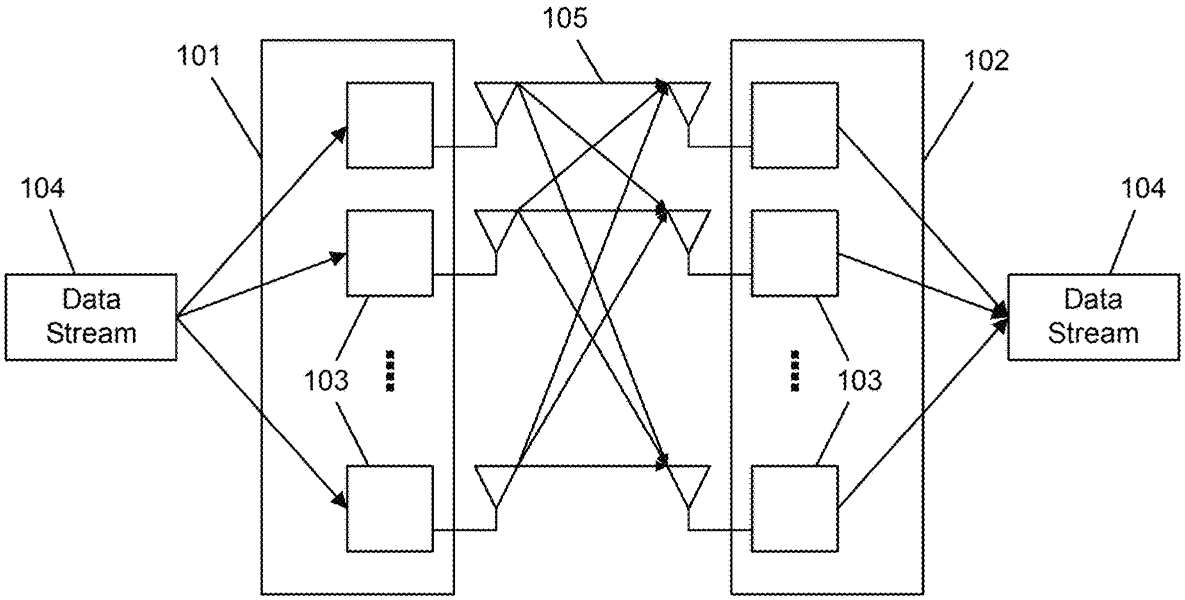
FIG. 1B (PRIOR ART)
FIG. 1B shows an example of spatial diversity in a MIMO communication system.

FIG. 1B shows an example of spatial diversity in a MIMO communication system. The MIMO communication system of FIG. 1B comprises the same components as that of FIG. 1A; however, in FIG. 1B, which shows spatial diversity instead of spatial multiplexing, each antenna 103 of the transmitter 101 may have a same spatial stream 105 with each antenna 103 of the receiver 102 to increase reliability of transmissions. The same spatial streams 105 are depicted in FIG. 1B by the continuous lines between antennae 103.

Figure 1C:
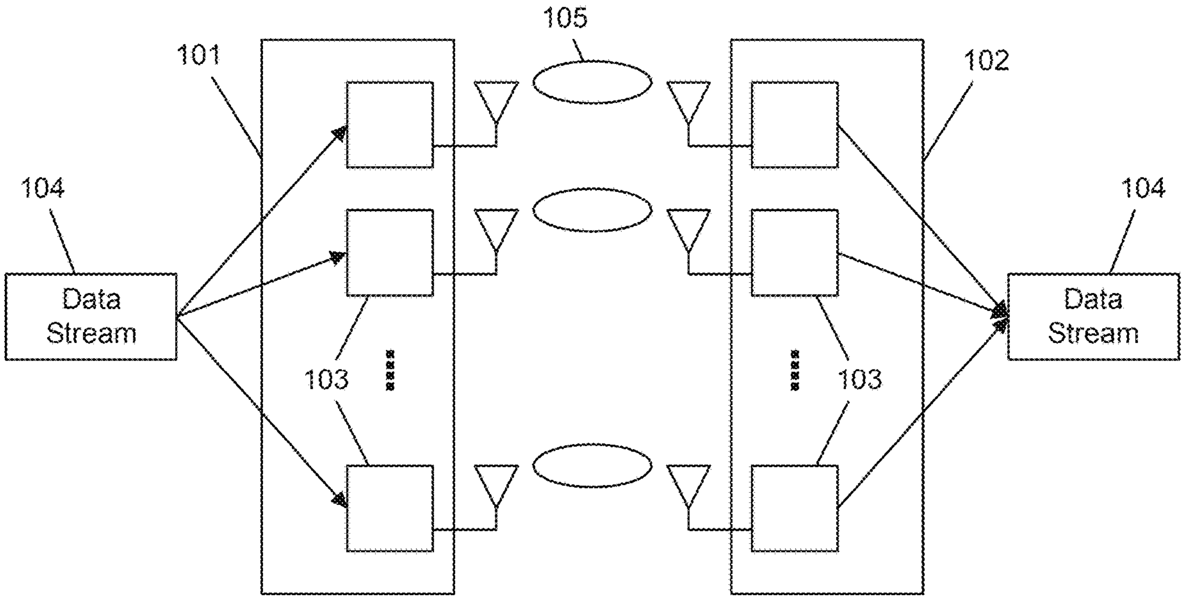
FIG. 1C (PRIOR ART)
FIG. 1C shows an example of beamforming in a MIMO communication system.

FIG. 1C shows an example of beamforming in a MIMO communication system. The MIMO communication system of FIG. 1C comprises the same components as that of FIG. 1A; however, in FIG. 1C, which shows beamforming instead of spatial multiplexing, each antenna 103 of the transmitter 101 may have a singular, focused spatial stream 105, forming a beam, with a respective target antenna 103 of the receiver 102. Each spatial stream 105 may be directed or steered towards the same target antenna 103 of the receiver 102 by adjusting the phase and amplitude of the transmission signal of that spatial stream 105. The focused spatial streams 105, i.e., the beams, are depicted in FIG. 1C by the ellipses between antennae 103.

In MIMO communications systems, such as those of FIGS. 1A to 1C, up to 16 spatial streams 105 may, typically, be considered to provide ultra-high-reliability (UHR) transmissions. Each of these spatial streams 105 may experience a different signal-to-noise ratio (SNR). For a single-user (SU) MIMO communication system, wherein one transmitter 101 with M antennae 103 and one receiver 102 with N antennae 103 are connected through a plurality of spatial streams 105 defining a communication channel, the channel coefficients may be denoted by matrix H where $H \in \mathbb{R}^{N \times M}$. The singular value decomposition (SVD) of the channel coefficients can be expressed by:

$$H = U \sum V^H \tag{1}$$

where U and V are two unitary matrices of size N×N and M×M, respectively, $(\bullet)^H$ denotes the conjugate transpose, and Σ is an N×M diagonal matrix with $r \le \min(M, N)$ non-negative real numbers such that $\Sigma = \mathrm{diag}(\lambda_1, \lambda_2, \ldots, \lambda_r)$ and $\lambda_1 \ge \lambda_2 > \ldots > \lambda_r$ are the singular values.

In SVD-based beamforming, as an example, the transmitter 101 multiplies the data signal $\bar{x}$ to be transmitted with V before sending the signal to each antenna 103 of the transmitter 101 to produce x (precoding), and the receiver 102 multiplies the signal received y from each antenna 103 of the receiver 102 by $U^H$ (receiver shaping) to recover $\bar{y}$. Precoding and receiver shaping transform the MIMO communication channel into r parallel single-input single-output (SISO) channels, as expressed by:

$$\bar{y} = U^H y = U^H (Hx + n) = U^H \left(U \sum V^H V \bar{x} + n\right) = \sum \bar{x} + \bar{n} \tag{2}$$

where n is an additive noise term and $\bar{n} = U^H n$. Accordingly, gain due to MIMO may concentrate on the spatial streams 105 with the largest singular values. In this case, assigning equal modulations, as provided by a same MCS, to each spatial stream 105 results in a sub-optimal throughput of transmissions.

To improve the throughput of transmissions in MIMO communication systems, embodiments of the present disclosure may enable UEQM of the spatial streams 105.

Figure 2:
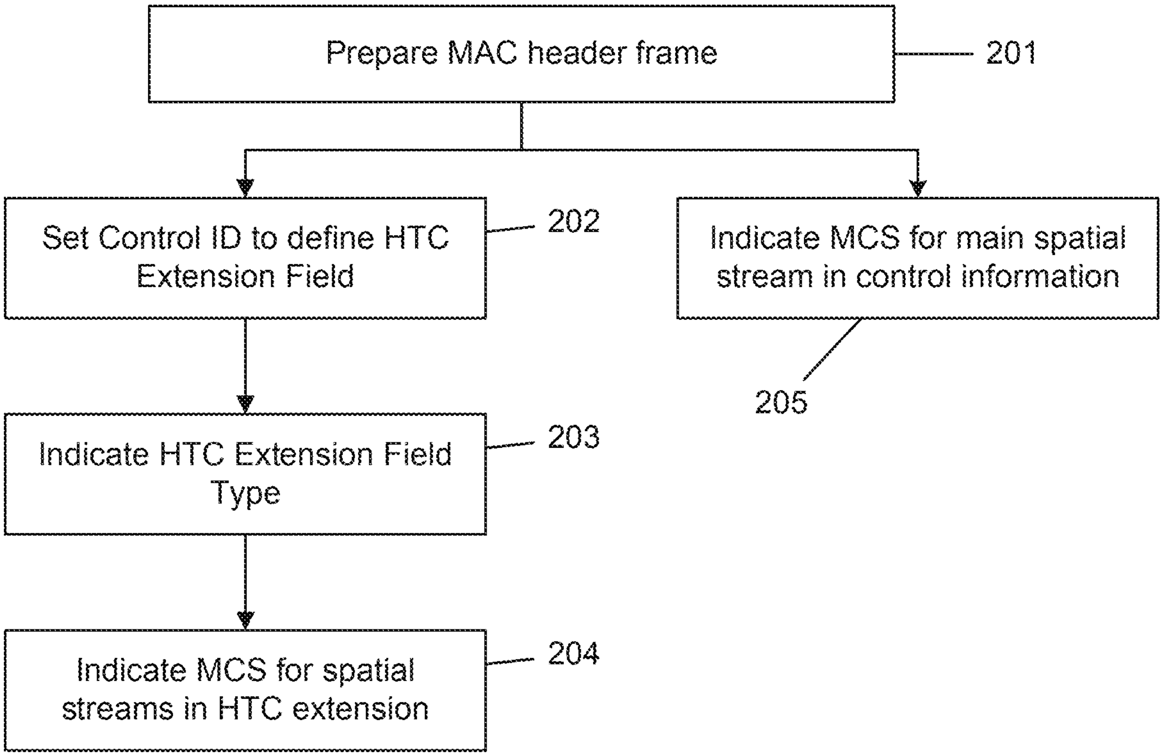
FIG. 2 shows a flowchart of a method for indicating UEQM parameters, in accordance with an embodiment of the present disclosure.

FIG. 2 shows a flowchart of an embodiment of a method for indicating UEQM parameters to antennae 103 of a MIMO communication system, in accordance with the present disclosure. The MIMO communication system may comprise a transmitter 101 and a receiver 102 each having a plurality of antennae 103, such that the MIMO communication system is a SU-MIMO. Alternatively, the MIMO communication system may further comprise a plurality of transmitters 101, such as a plurality of stations, such that the MIMO communication system is a multi-user (MU) MIMO communication system. Each antenna 101 of a transmitter 101 may be in wireless communication with one or more antennae 103 of a receiver 102 through a respective one or more spatial streams 105. Each transmitter 101 and receiver 102 may, for example, be a Wi-Fi device or access point. At action 201 of FIG. 2, a MAC header may be prepared for a PPDU that is to be transmitted from a transmitter 101 to a receiver 102. The MAC header may have a plurality of fields, including an HT control field, which may in turn have a control sub-field, and particularly, an A-control subfield. The A-control sub-field may include a control identifier (ID) and control information. The control information may include a plurality of bits. At action 202, the control ID may be set to define, in the MAC header, an HTC extension field including a plurality of bits. At action 203, a set of bits in the plurality of bits of the HTC extension field may be used to indicate an HTC extension type. The HTC extension type, may for example, be a UHR LA extension. At action 204, one or more groups of bits of the plurality of bits of the HTC extension field may be used to indicate one or more UEQM parameters (i.e., a first grouping of UEQM parameters) for transmission of the PPDU, in accordance with the indicated HTC extension type. Each of the one or more groups of bits may be distinct from each other and from the set of bits used to indicate the HTC extension type. Each of the one or more UEQM parameters of the first grouping of UEQM parameters may define a respective modulation scheme, such as an MCS or quadrature amplitude modulation (QAM), for at least one of the spatial streams 105. At action 205, the plurality of bits of the control information may be used to indicate another one or more groups of UEQM parameters (i.e., a second grouping of UEQM parameters) for transmission of the PPDU. The second grouping of UEQM parameters may define a modulation scheme, such as an MCS or QAM modulation, for a main spatial stream from among the spatial streams 105 of the MIMO communication system. The main spatial stream may be the spatial stream 105 with the largest singular value in channel coefficients for the MIMO communication system.

In some embodiments of the method of FIG. 2, the first grouping of UEQM parameters may define the modulation scheme for a plurality of spatial streams 105 by respective delta modulations. The respective delta modulation for a spatial stream 105 may be a difference in a modulation order for the respective spatial stream 105 and a modulation order for another, higher order spatial stream 105 of the plurality of spatial streams 105. In some embodiments, a supplemental set of bits of the plurality of bits of the HTC extension field may be used to indicate one or more LA parameters. In some other embodiments, the control information may be used to indicate a number of the spatial streams 105 and the one or more UEQM parameters of the first grouping of UEQM parameters may define the respective modulation scheme for the at least one spatial stream 105 through a pre-determined index.

Figure 3:
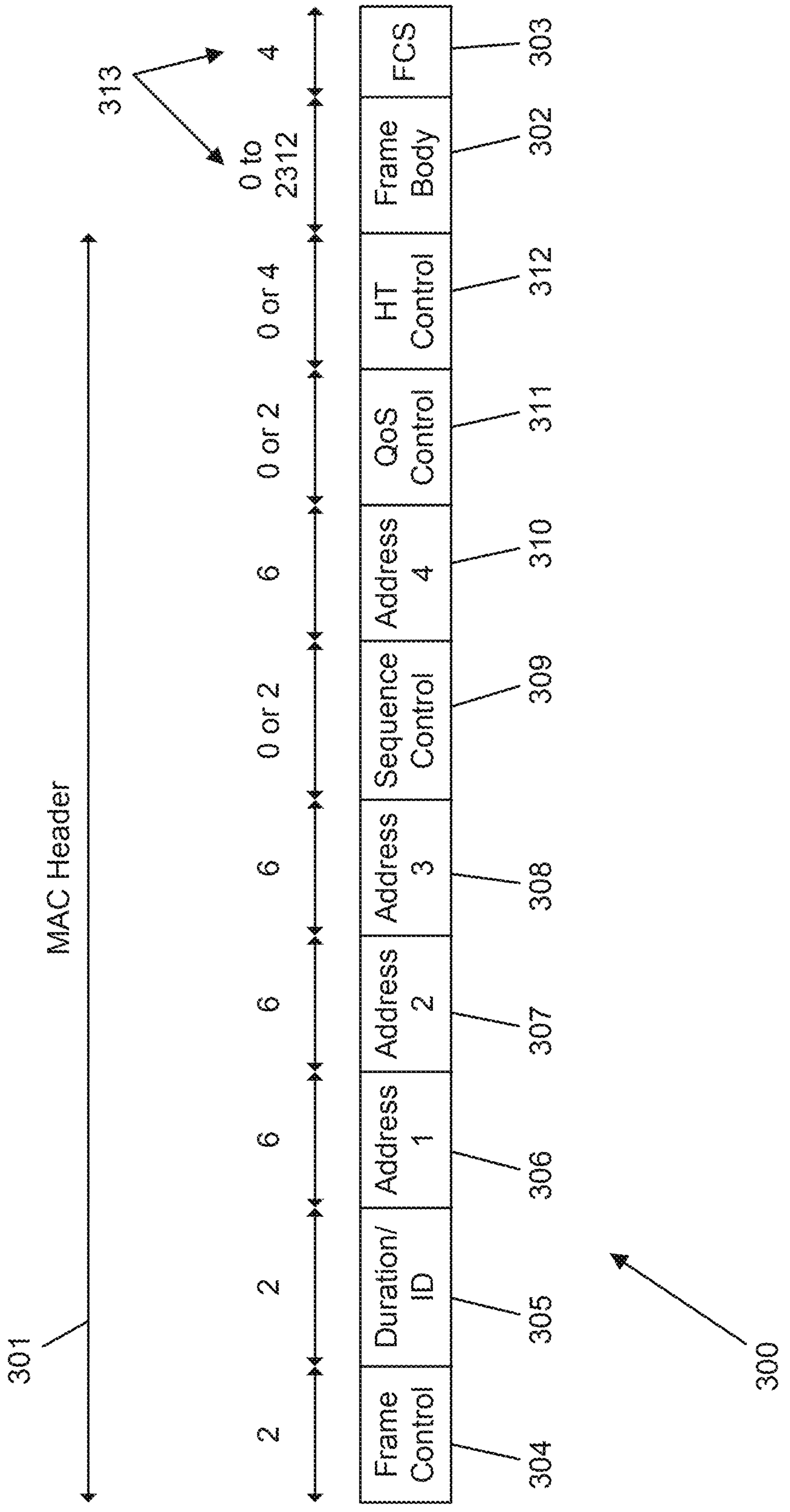
FIG. 3 (PRIOR ART)
FIG. 3 shows an example of a medium access control frame.

FIG. 3 shows an example of a MAC frame 300 and MAC header 301 for a PPDU. The MAC frame 300 may, for example, be a control wrapper frame, a quality-of-service (QOS) data frame, or a management frame. The MAC frame 300 may comprise the MAC header 301 as well as a frame body 302 and a frame check sum (FCS) field 303. The MAC header 301 may comprise fields for: frame control 304, duration or identification 305, a first address 306, a second address 307, a third address 308, sequence control 309, a fourth address 310, QoS control 311, and HT control 312. Each field of the MAC frame may include a respective one or more bytes 313. Inclusion of the HT control field 312 may be determined by an HTC subfield of the frame control field 304. Table 1 below shows the format, by subfields, for three different variants of an HT control field 312 transmitted by a non-control mode management group (non-CMMG) station: a HT variant, a very-high-throughput (VHT) variant, and a high-efficiency/extremely-high-throughput (HE/EHT) variant. Subfields in Table 1 are indicated by their bit positions (e.g., B0, B1, B2 . . . ) and may include a HT control middle subfield, a VHT control middle subfield, an autocorrelation (AC) constraint subfield, a response delay grant (RDG)/more PPDU subfield, and an A-control subfield.

TABLE 1

Subfields for HT control field 312 variants.

| Variant | B0 | B1 | B2 to B29 | B30 | B31 |
|---|---|---|---|---|---|
| HT | 0 | HT Control Middle | | AC Constraint | RDG/More PPDU |
| VHT | 1 | 0 | VHT Control Middle | AC Constraint | RDG/More PPDU |
| HE/EHT | 1 | 1 | A-Control | | |

Figure 4:
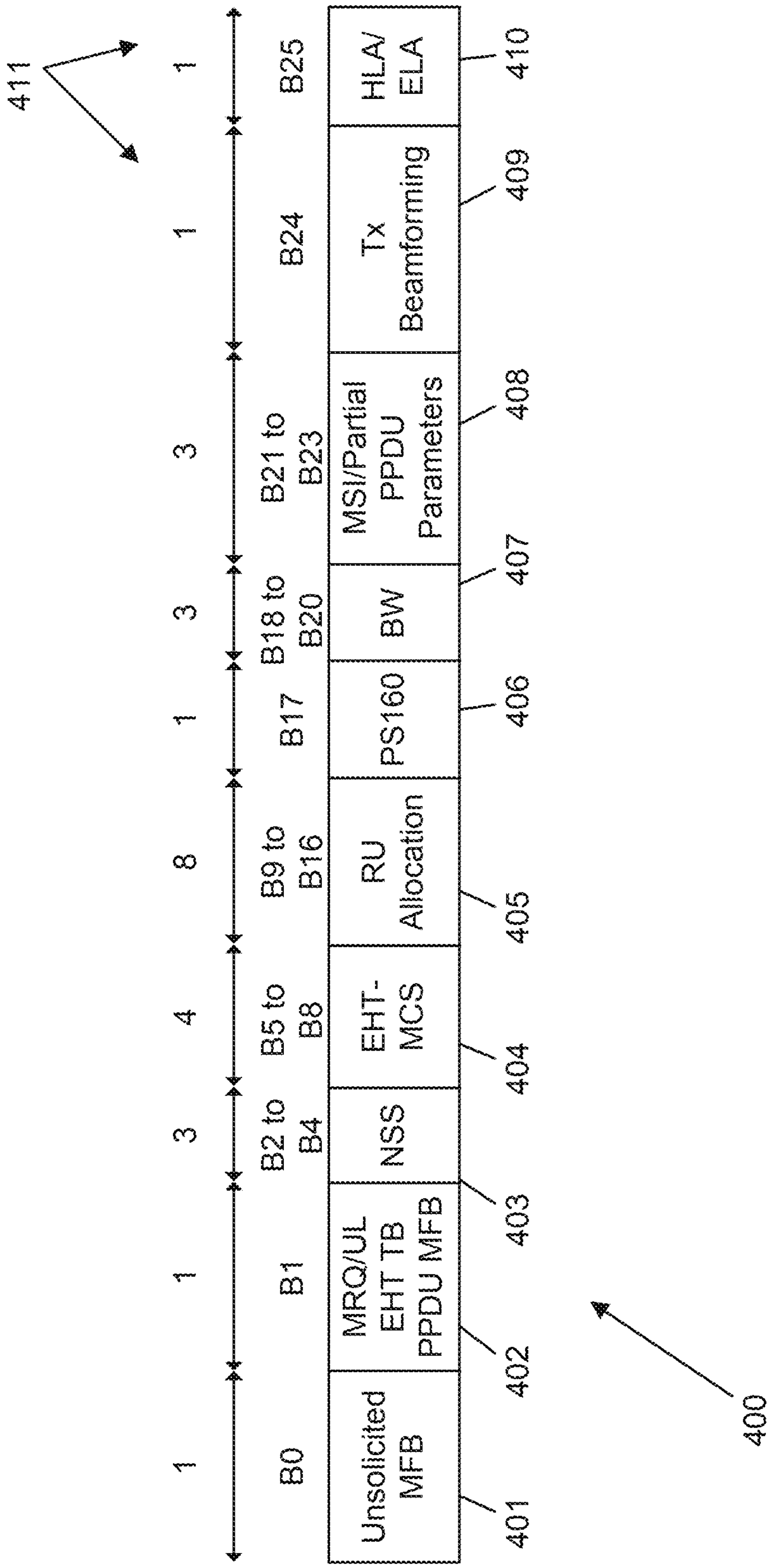
FIG. 4 (PRIOR ART)
FIG. 4 shows an example of a schematic for control information in a high-throughput control field.

In HE/EHT variants, the HT control field 312 may be used to include LA parameters. The A-control subfield may span 30 bits, of which four may be used to indicate a control ID and the remaining 26 may be used for control information. Table 2 shows the different values that the control ID may take and the associated meaning of each control ID. Eleven of the values indicate currently defined control fields while another five values are reserved for future indications. For some control IDs, only a portion of the 26 bits of control information may be needed. In these cases, the remaining bits may be padded with zeros. A control ID of value two (i.e., “10”) indicates an HE LA (HLA)/EHT LA (ELA) control field and the remaining 26 bits are allocated for control information. FIG. 4 shows an example of a schematic for the control information 400 with an ELA control ID defined. The control information 400 may comprise further subfields for: an unsolicited management frame block (MFB) 401, a management request (MRQ)/uplink (UL) EHT trigger-based (TB) PPDU MFB 402, a number of spatial streams 403, an EHT-MCS 404, resource unit (RU) allocation 405, a primary 160 MHz (PS160) subfield 406, bandwidth (BW) 407, MAC sequence control information (MSI)/partial PPDU parameters 408, transmitter (Tx) beamforming 409, and HLA/ELA 410. Each of these subfields may include one or more bits 411, at the positions shown in FIG. 4 (e.g., B0, B1, B2 . . . ).

TABLE 2

Control ID values and meanings.

| Control ID Value | Meaning | Length of the Control Information Subfield (bits) |
|---|---|---|
| 0 | Triggered Response Scheduling (TRS) | 26 |
| 1 | Operating Mode (OM) | 12 |
| 2 | HE LA (HLA)/EHT LA (ELA) | 26 |
| 3 | Buffer Status Report (BSR) | 26 |
| 4 | UL Power Headroom (UPH) | 8 |
| 5 | Bandwidth Query Report (BQR) | 10 |
| 6 | Command and Status (CAS) | 8 |
| 7 | EHT Operating Mode (EHT OM) | 6 |
| 8 | Single Response Scheduling (SRS) | 10 |
| 9 | Access Point Assistance Request (AAR) | 20 |
| 10 to 14 | Reserved | — |
| 15 | Ones Need Expansion Surely (ONES) | 26 |

Figure 5:
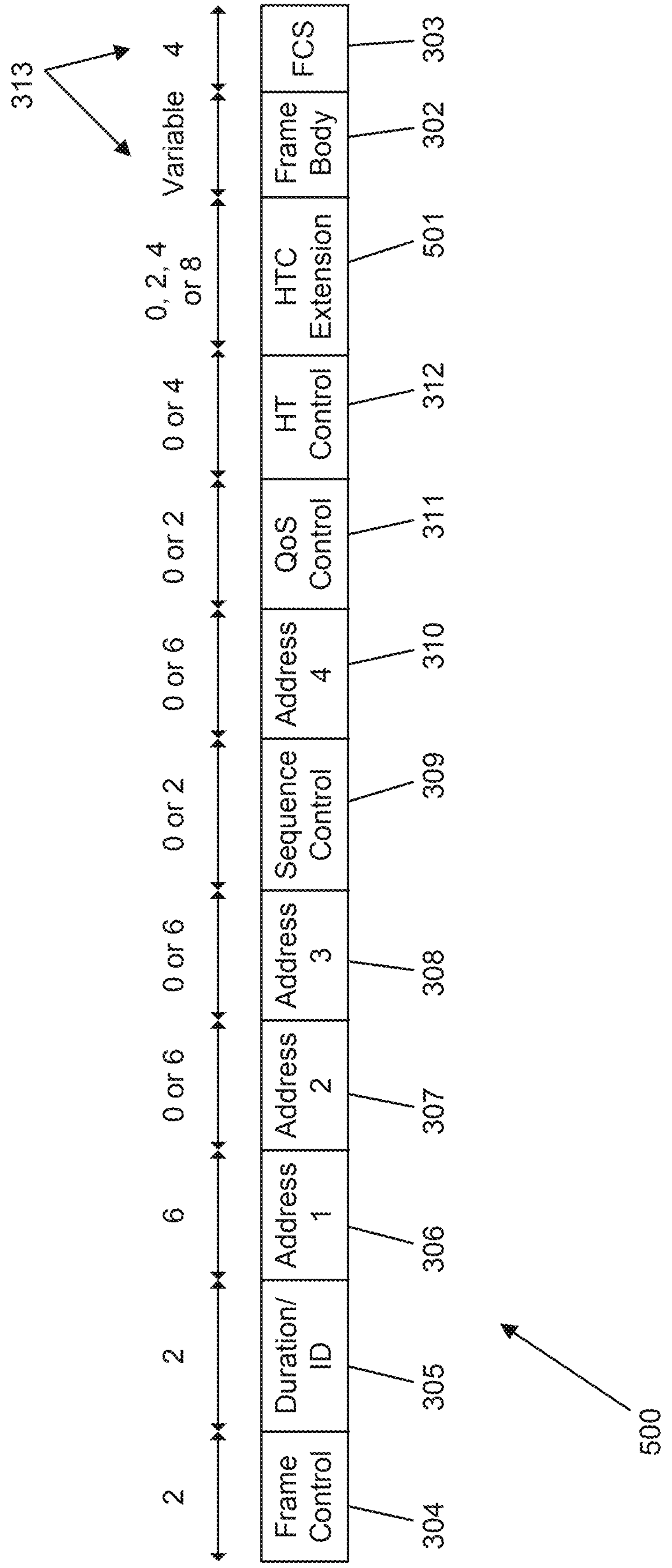
FIG. 5 shows a schematic of a medium access control frame, in accordance with an embodiment of the present disclosure.

FIG. 5 shows a MAC frame 500 having an HTC extension field 501, in accordance with an embodiment of the present disclosure. The HTC extension field 501 may correspond to the one of action 202 described in relation to FIG. 2. The MAC frame 500 may further include one or more of the fields of the MAC frame 300 described in relation to FIG. 3. Each field may include one or more bytes 313. An HT control field 312 may be among the fields included in the MAC frame 500. The HT control field 312, as described in relation to FIG. 4, may have a control ID that can be set to define the HTC extension field 501 in the MAC frame 500, as described in relation to action 202 of FIG. 2. For example, the control ID may be set to 15 (i.e., "1111"). The HTC extension field 501, in particular, may include, for example, two, four, or eight bytes. The HT control field 312, as described in relation to FIG. 4, may further have bits for control information, which can be used to indicate one or more groups of UEQM parameters, such as those defining a modulation scheme for a main spatial stream, as described in relation to action 205 of FIG. 2. For example, the MCS for a main spatial stream may be indicated at B5 to B8 of the control information when a control ID is set to a value for ELA (i.e., a control ID equal to two).

Figure 6:
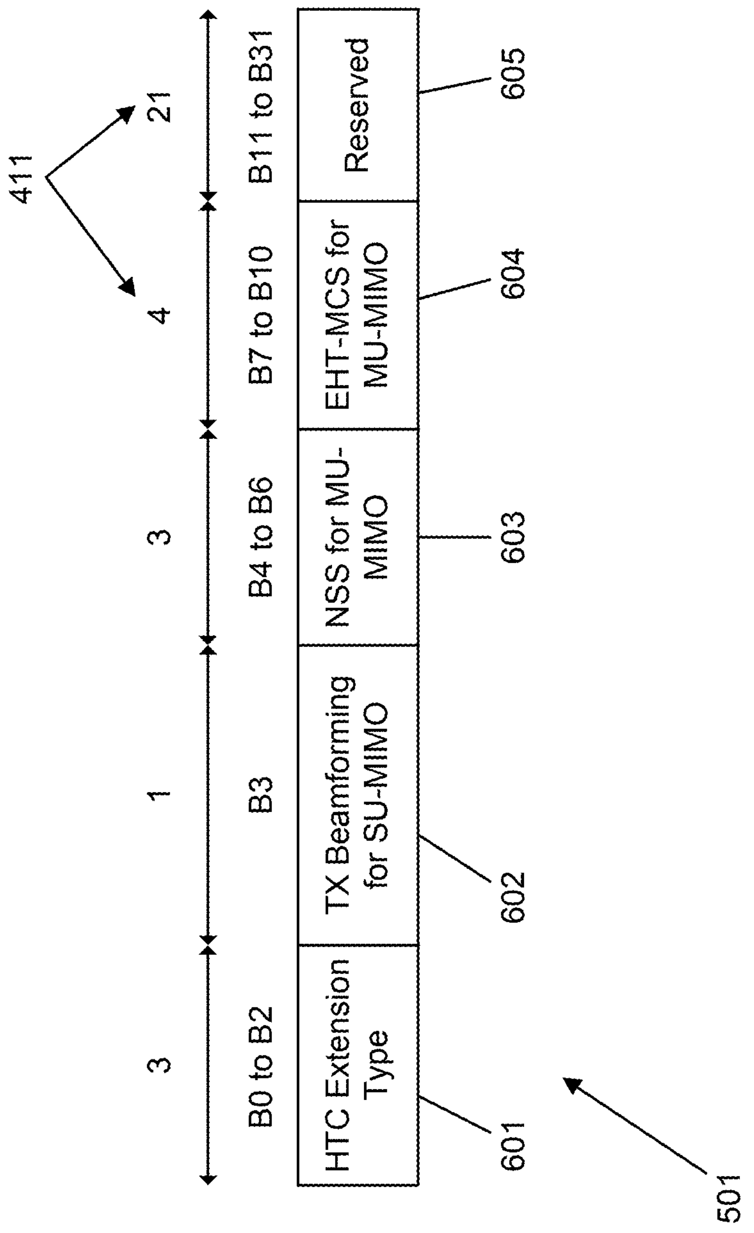
FIG. 6 shows a schematic of a high-throughput control extension, in accordance with an embodiment of the present disclosure.

FIG. 6 shows a schematic for an HTC extension field 501, in accordance with an embodiment of the present disclosure. The HTC extension field 501 may comprise a subfield for an HTC extension type 601. The HTC extension type 601 may include a set of m bits, where mis a natural integer such as three. An HTC extension type 601 of "000" may, for example, represent a UHR LA extension. The HTC extension type 601 may correspond to the one of action 203 described in relation to FIG. 2. The remaining bits of the HTC extension field 501 may be used to indicate UEQM parameters, LA parameters, or other information in accordance with the HTC extension type 601. These parameters and information may be provided through the following examples of subfields: Tx beamforming for SU-MIMO 602, an NSS for MU-MIMO 603, an EHT-MCS for MU-MIMO 604, and reserved space 605. Each subfield may include one or more bits 411, at the positions shown in FIG. 6 (e.g., B0, B1, B2 . . . ). The subfields of the HTC extension field 501 may correspond to the one or more groups of bits of action 204 described in relation to FIG. 2.

Figure 7:
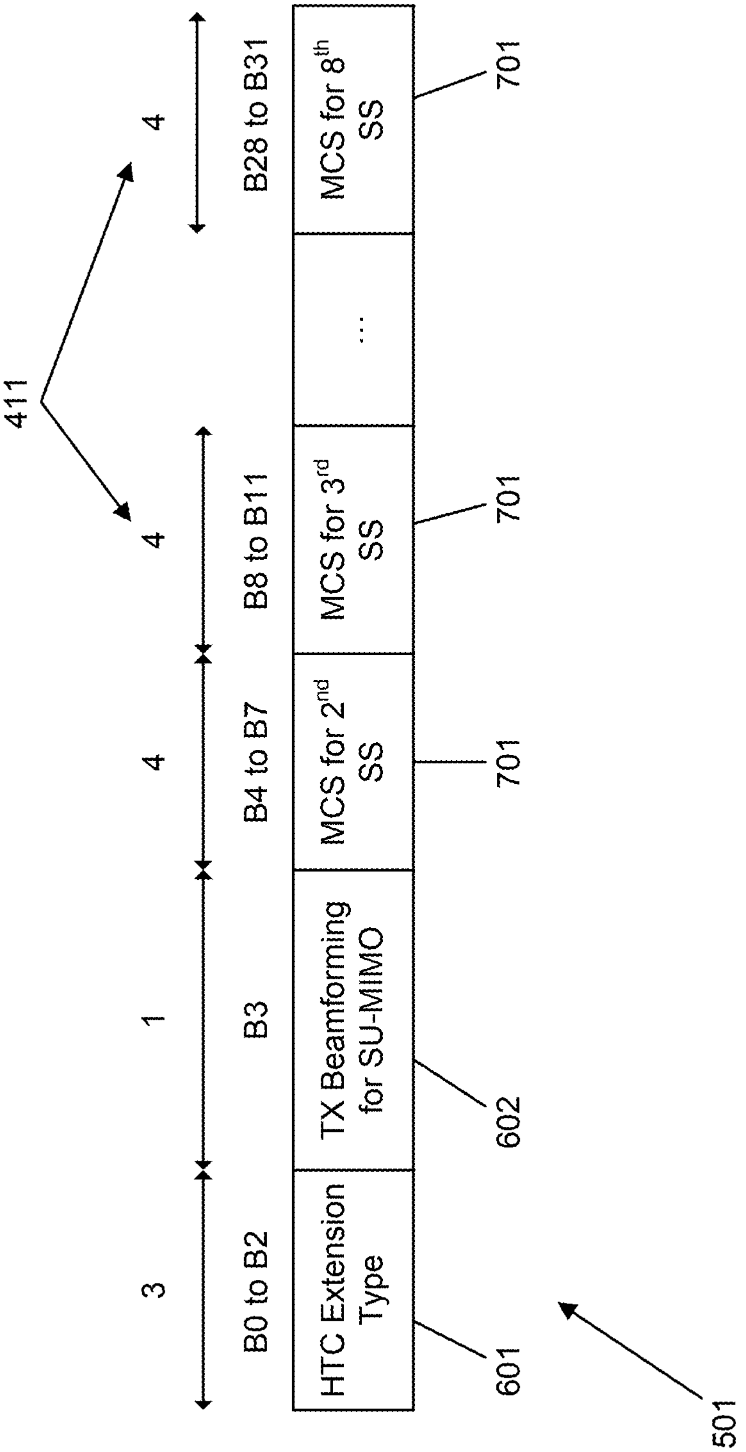
FIG. 7 shows another schematic of a high-throughput control extension, in accordance with an embodiment of the present disclosure.

FIG. 7 shows a schematic for an HTC extension field 501, in accordance with an embodiment of the present disclosure. Here, the HTC extension type 601 is set to define a UHR LA extension. In this embodiment, the MCS for a main spatial stream (i.e., a $1^{st}$ SS) may be indicated in the control information 400 of the HT control field 312, such as at bits B5 to B8 of the control information (i.e., in the EHT-MCS subfield 404). The HTC extension field 501 may comprise, in addition to the HTC extension type 601, subfields for Tx beamforming for SU-MIMO 602 and, when the Tx beamforming for SU-MIMO 602 is set to "1", the MCS 701 for a plurality of spatial streams (SS) 105. For example, the MCS 701 of seven spatial streams 105 may be indicated (i.e., the MCSs for a $2^{nd}$ to $8^{th}$ SS).

Figure 8:
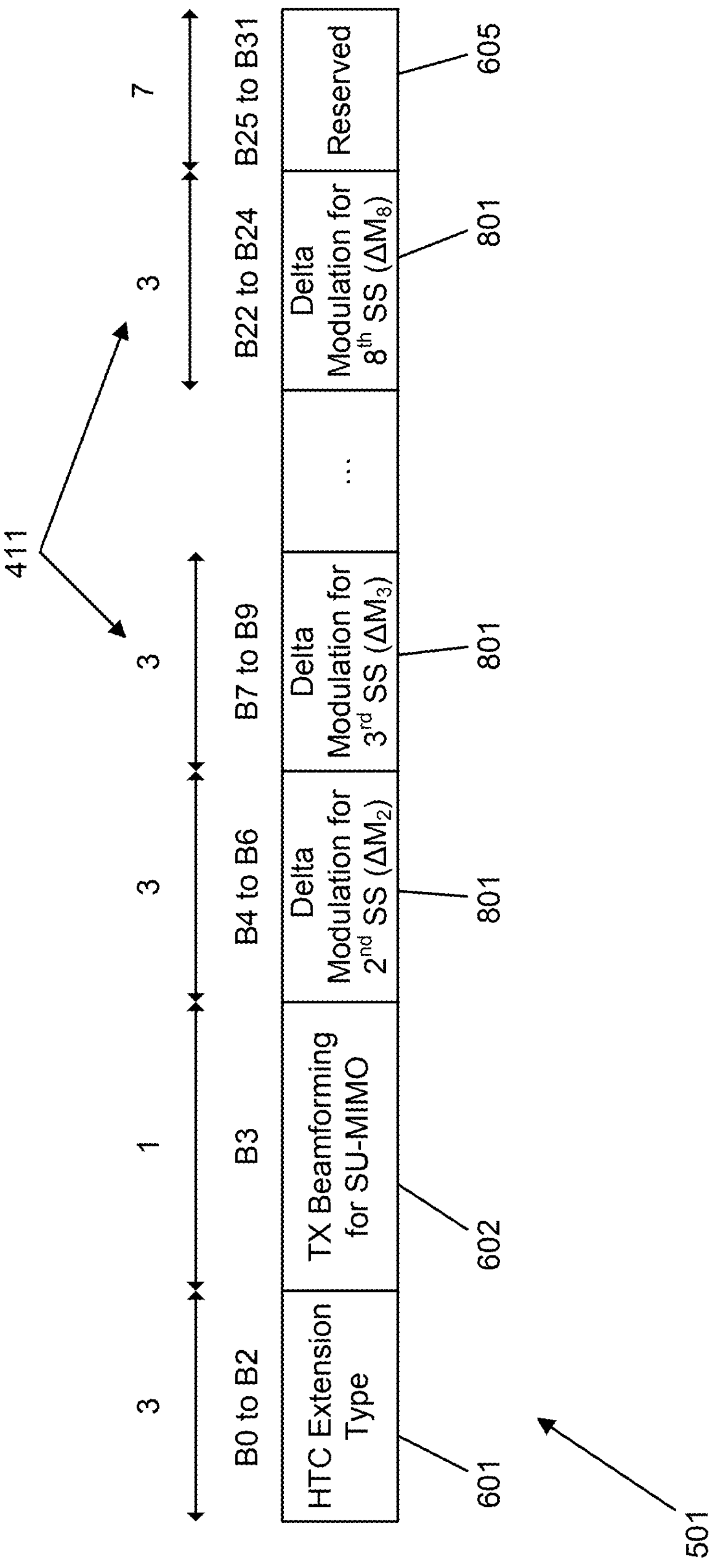
FIG. 8 shows another schematic of a high-throughput control extension, in accordance with an embodiment of the present disclosure.

FIG. 8 shows another schematic for an HTC extension field 501, in accordance with an embodiment of the present disclosure. Here, the HTC extension type 601 is set to define a UHR LA extension. In this embodiment, the MCS for a main spatial stream (i.e., a $1^{st}$ SS) may be indicated in the control information 400 of the HT control field 312. The HTC extension field 501 may comprise, in addition to the HTC extension type 601, subfields for Tx beamforming for SU-MIMO 602 and a delta modulation 801 (ΔM) for a plurality of spatial streams 105. The delta modulation 801 for an $i^{th}$ spatial stream 105 may define a modulation order MO for that spatial stream through a difference with the modulation order of a consecutive spatial stream, as expressed by:

$$\Delta M_i = MO(SS_i) - MO(SS_{i-1}) \tag{3}$$

Figure 9:
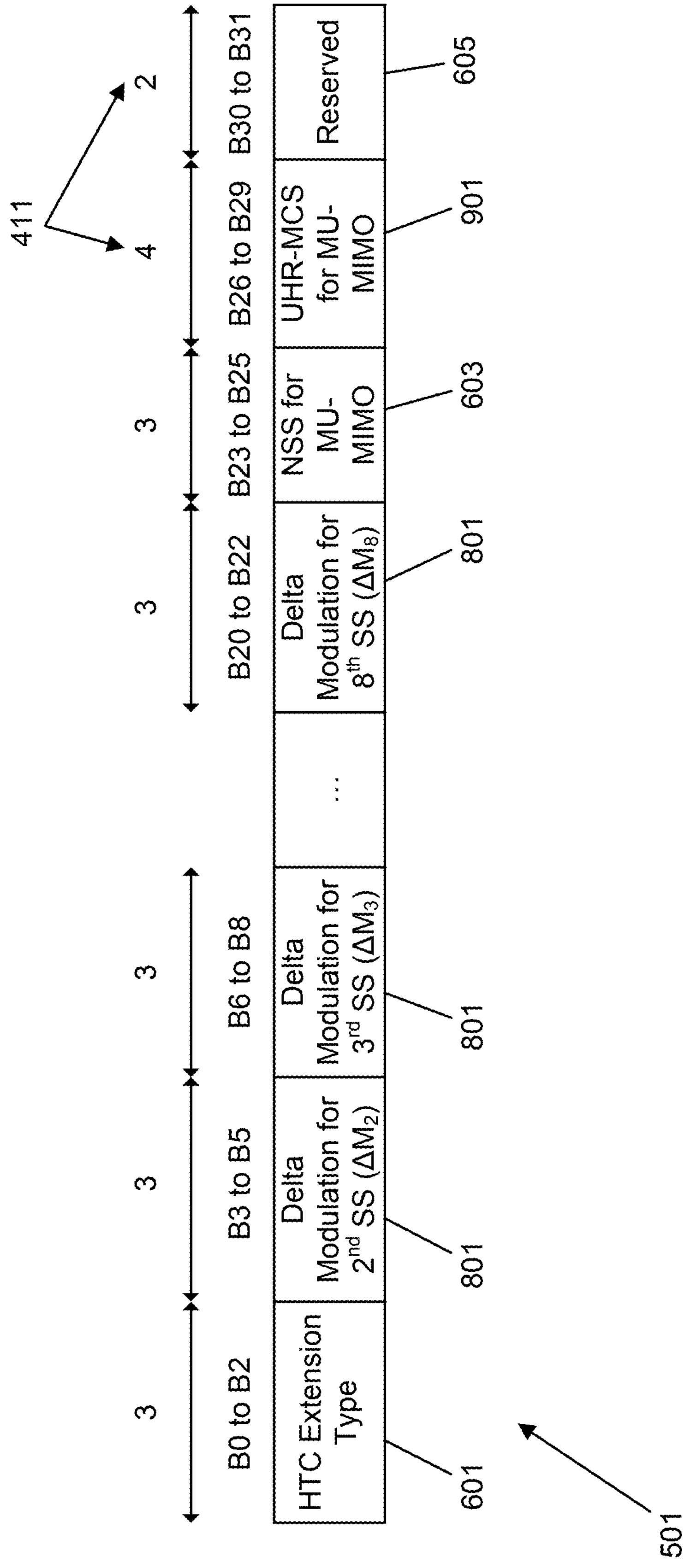
FIG. 9 shows another schematic of a high-throughput control extension, in accordance with an embodiment of the present disclosure.

FIG. 9 shows another schematic for an HTC extension field 501, in accordance with an embodiment of the present disclosure. Here, the HTC extension type 601 is set to define a UHR LA extension. In this embodiment, the MCS for a main spatial stream (i.e., a $1^{st}$ SS) may be indicated in the control information 400 of the HT control field 312. The HTC extension field 501 may comprise, in addition to the HTC extension type 601, subfields for a delta modulation 801 for a plurality of spatial streams 105 and subfields for MU-MIMO LA parameters, such as an NSS for MU-MIMO 603 and a UHR-MCS for MU-MIMO 901.

Figure 10:
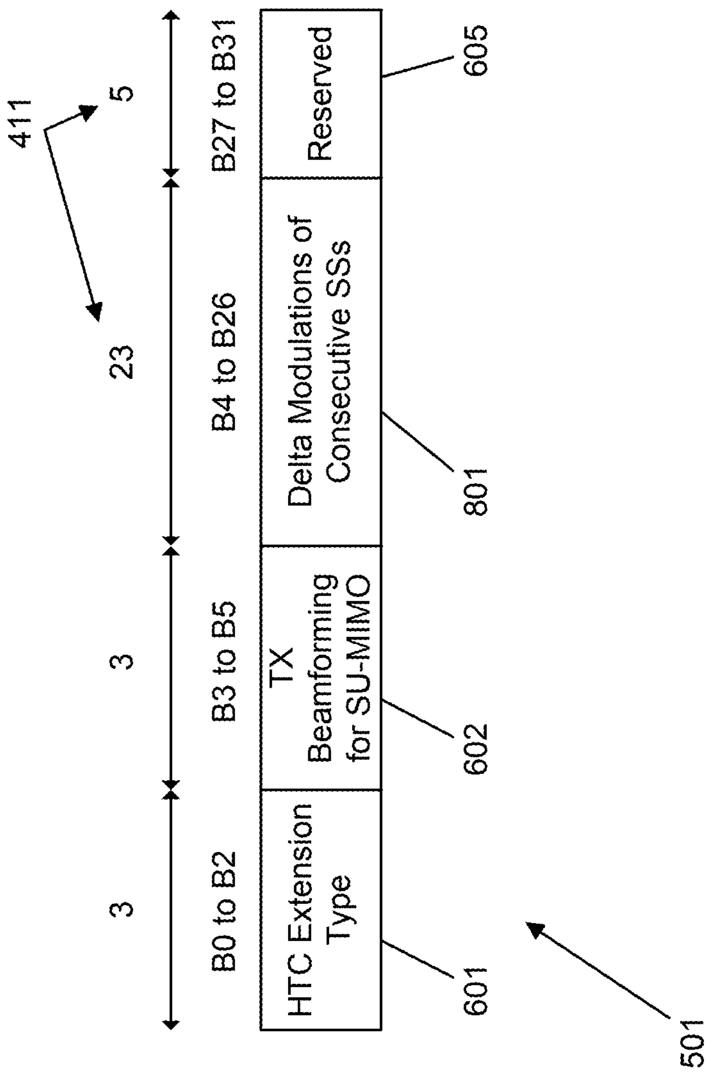
FIG. 10 shows another schematic of a high-throughput control extension, in accordance with an embodiment of the present disclosure.

FIG. 10 shows another schematic for an HTC extension field 501, in accordance with an embodiment of the present disclosure. Here, the HTC extension type 601 is set to define a UHR LA extension. In this embodiment, the MCS for a main spatial stream (i.e., a $1^{st}$ SS) may be indicated in the control information 400 of the HT control field 312. The HTC extension field 501 may comprise, in addition to the HTC extension type 601, subfields for Tx beamforming for SU-MIMO 602 and a delta modulation 801 for a plurality of spatial streams 105. In this embodiment, a change in modulation order for consecutive spatial streams 105, i.e., a non-zero delta modulation 801, may be indicated by a "1" bit followed by three bits indicating the delta modulation 801. When there is no change in the modulation order, this may be indicated by a "0" bit. In the case of lower amounts of bits being used than that allotted for the delta modulations 801 (e.g., less than 23 bits), the remaining, unused bits may be padded with zeros.

Table 3 below shows an example of pre-determined indices that may be used to indicate, in an HTC extension field 501, common combinations of modulations, in accordance with an embodiment of the present disclosure. In this embodiment, each pre-determined index may represent a unique combination of MCSs 701 for a plurality of spatial streams 105. The number of spatial streams 403 and the pre-determined index may be indicated in the control information 400 of the HT control field 312, such as at bits B2 to B4 and B5 to B8, respectively. In the example of Table 3, indices are shown for combinations of modulations, including 16QAM, quadrature phase-shift keying (QPSK), and binary phase-shift keying (BPSK), for first and second spatial streams 105 of two spatial streams 105. A code rate of ½ is used in the example of Table 3.

| | | Modulation | |
|---|---|---|---|
| Index | Code Rate | $1^{st}$ Spatial Stream | $2^{nd}$ Spatial Stream |
| 0 | 1/2 | 16QAM | QPSK |
| 1 | 1/2 | 16QAM | BPSK |
| 2 | 1/2 | QPSK | BPSK |

Embodiments of the present disclosure have been described hereinabove through examples of MAC frames 500 and HTC extension fields 501. In some other embodiments, fields of the MAC frame 500 and subfields of the HTC extension field 501 may be provided in various sequences, may include various amounts of bits, may be combined through various combinations, and may contain additional information for UEQM and/or LA.

Embodiments of the present disclosure may be implemented using electronics hardware, software, or a combination thereof. In some embodiments, the invention may be implemented by one or multiple computer processors executing program instructions stored in memory. In some embodiments, the invention may be implemented partially or fully in hardware, for example using one or more field programmable gate arrays (FPGAs) or application specific integrated circuits (ASICs) to rapidly perform processing operations.

Figure 11:
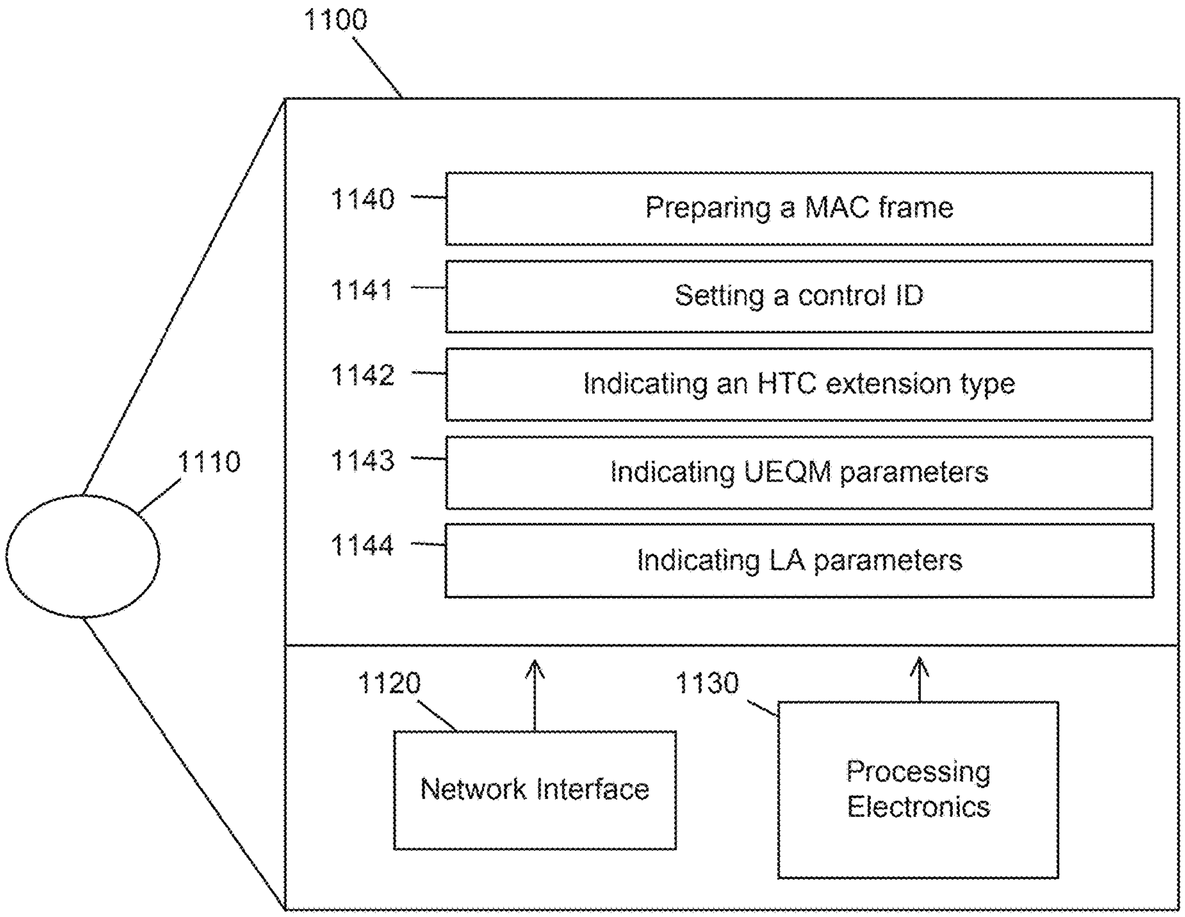
FIG. 11 shows a schematic of an apparatus for indicating UEQM according to embodiments of the present disclosure.

FIG. 11 shows an apparatus 1100 for providing UEQM indications, according to embodiments of the present invention. The apparatus may be located at a node 1110 of a network, such as at either a transmitter 101 or a receiver 102. The apparatus may include a network interface 1120 and processing electronics 1130. The processing electronics 1130 may include a computer processor executing program instructions stored in memory, or other electronics components such as digital circuitry, including for example FPGAs and ASICs. The network interface 1120 may include an optical communication interface or radio communication interface, such as wireless antenna 103. The apparatus may include several functional components, each of which may be partially or fully implemented using the underlying network interface 1120 and processing electronics 1130. Examples of functional components may include modules for preparing 1140 a MAC frame, setting 1141 a control ID, indicating 1142 an HTC extension type, indicating 1143, UEQM parameters, and indicating 1144 LA parameters.

Figure 12:
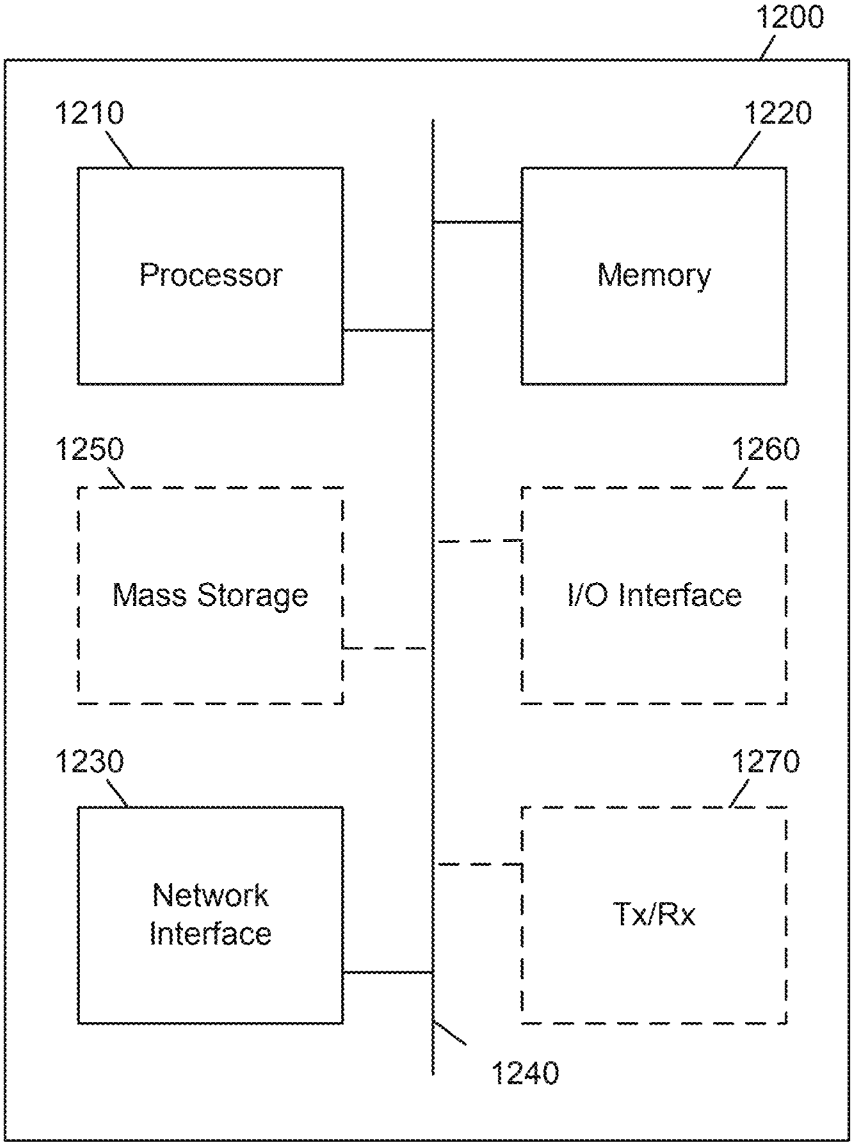
FIG. 12 shows a schematic of an embodiment of an electronic device that may implement at least part of the methods and features of the present disclosure.

FIG. 12 shows a schematic diagram of an electronic device 1200 that may perform any or all of the operations of the above methods and features explicitly or implicitly described herein, according to different embodiments of the present disclosure. For example, a computer equipped with network function may be configured as electronic device 1200. The electronic device 1200 may be used to implement the apparatus 1100 of FIG. 11, for example. The electronic device 1200 may further be used as part of a transmitter 101 or receiver 102, for example.

As shown, the electronic device 1200 may include a processor 1210, such as a Central Processing Unit (CPU) or specialized processors such as a Graphics Processing Unit (GPU) or other such processor unit, memory 1220, network interface 1230, and a bi-directional bus 1240 to communicatively couple the components of electronic device 1200. Electronic device 1200 may also optionally include non-transitory mass storage 1250, an I/O interface 1260, and a transceiver 1270. According to certain embodiments, any or all of the depicted elements may be utilized, or only a subset of the elements. Further, the electronic device 1200 may contain multiple instances of certain elements, such as multiple processors, memories, or transceivers. Also, elements of the hardware device may be directly coupled to other elements without the bi-directional bus 1240. Additionally or alternatively to a processor and memory, other electronics, such as integrated circuits, may be employed for performing the required logical operations.

The memory 1220 may include any type of tangible, non-transitory memory such as static random access memory (SRAM), dynamic random access memory (DRAM), synchronous DRAM (SDRAM), read-only memory (ROM), any combination of such, or the like. The mass storage element 1250 may include any type of tangible, non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1250 may have recorded thereon statements and instructions executable by the processor 1210 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product may include a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via an electronic element depending on the particular context. The term "and/or" herein when used in association with a list of items means any one or more of the items comprising that list.

Although a combination of features is shown in the illustrated embodiments, not all of them need to be combined to realize the benefits of various embodiments of this disclosure. In other words, a system or method designed according to an embodiment of this disclosure will not necessarily include all features shown in any one of the Figures or all portions schematically shown in the Figures. Moreover, selected features of one example embodiment may be combined with selected features of other example embodiments.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for providing a plurality of unequal modulation (UEQM) parameters for each of a plurality of antennae for transmission of a physical protocol data unit (PPDU) by one or more respective spatial streams, the method comprising:

preparing, for the PPDU, a medium access control (MAC) header including a high-throughput (HT) control field having a control sub-field, the control sub-field including a control identifier (ID);

setting the control ID to define, in the MAC header, a HT control (HTC) extension having a plurality of bits;

indicating, by a set of bits of the plurality of bits, an HTC extension type;

and indicating, by one or more groups of bits of the plurality of bits, one or more UEQM parameters from among the plurality of UEQM parameters in accordance with the HTC extension type, each of the one or more groups of bits of the plurality of bits being distinct from each other and from the set of bits, each of the one or more UEQM parameters defining a respective modulation scheme for at least one spatial stream of the one or more respective spatial streams of the plurality of antennae.

2. The method of claim 1 wherein:

indicating, by the one or more groups of bits of the plurality of bits, the one or more UEQM parameters from among the plurality of UEQM parameters in accordance with the HTC extension type includes:

indicating, by a respective one or more groups of bits of the plurality of bits, a transmitter beamforming parameter for single-user multiple input multiple output (MIMO) communication.

3. The method of claim 1 wherein:

indicating, by the one or more groups of bits of the plurality of bits, the one or more UEQM parameters from among the plurality of UEQM parameters in accordance with the HTC extension type includes:

indicating, by a respective one of the one or more groups of bits of the plurality of bits, a number of spatial streams for multiple-user MIMO communication.

4. The method of claim 1 wherein:

indicating, by the one or more groups of bits of the plurality of bits, the one or more UEQM parameters from among the plurality of UEQM parameters in accordance with the HTC extension type includes:

indicating, by a respective one of the one or more groups of bits of the plurality of bits, an ultra-high-reliability modulation scheme for multiple-user MIMO communication.

5. The method of claim 1 wherein:

indicating, by the one or more groups of bits of the plurality of bits, the one or more UEQM parameters from among the plurality of UEQM parameters in accordance with the HTC extension type further includes:

indicating, by a respective one of the one or more groups of bits of the plurality of bits, an extremely-high-throughput modulation scheme for multiple-user MIMO communication.

6. The method of claim 1 wherein:

indicating, by the set of bits of the plurality of bits, the HTC extension type includes:

indicating, by the set of bits of the plurality of bits, an ultra-high-reliability (UHR) link adaptation extension type.

7. The method of claim 6 wherein:

the one or more UEQM parameters is a first grouping of one or more UEQM parameters;

the control sub-field further includes control information having an additional plurality of bits;

and the method further comprises:

indicating, by the additional plurality of bits of the control information, a second grouping of one or more UEQM parameters from among the plurality of UEQM parameters, the second grouping of one or more UEQM parameters defining a modulation scheme for a main spatial stream from among the one or more respective spatial streams of each antenna of the plurality of antennae.

8. The method of claim 7 wherein:

indicating, by the one or more groups of bits of the plurality of bits, the one or more UEQM parameters from among the plurality of UEQM parameters in accordance with the HTC extension type includes:

indicating, by a respective one or more groups of bits of the plurality of bits, the respective modulation scheme for each spatial stream of a set of spatial streams from among the one or more spatial streams, the set of spatial streams excluding the main spatial stream.

9. The method of claim 7 wherein each of the one or more UEQM parameters of the first grouping of one or more UEQM parameters defines the respective modulation scheme by a respective delta modulation, each delta modulation defining a respective difference comprised between the respective modulation scheme and a respective one other modulation scheme defined by a respective other UEQM parameter of the first grouping of one or more UEQM parameters or by the second grouping of one or more UEQM parameters.

10. The method of claim 9 wherein each delta modulation defines the respective difference comprised between the respective modulation scheme and the respective one other modulation scheme according to a respective modulation order of the respective modulation scheme and a respective modulation order of the respective one other modulation scheme.

11. The method of claim 9 wherein, for each delta modulation, the respective spatial streams for the respective modulation scheme and the respective one other modulation scheme are consecutive.

12. The method of claim 9 further comprising:

indicating, by a supplemental set of bits of the plurality of bits, one or more multi-user multiple-input multiple-output (MU-MIMO) LA parameters.

13. The method of claim 9 wherein, for each delta modulation being non-zero, the respective delta modulation is indicated by a respective one of the one or more groups of bits of the plurality of bits, the respective one group of bits being a bit having a value of 1 followed by three bits each having a respective value representing the respective delta modulation.

14. The method of claim 13 wherein, for each delta modulation being zero, the respective delta modulation is indicated by a respective one of the one or more groups of bits of the plurality of bits, the respective one of the one or more groups of bits being a group of bits that have a value of zero.

15. The method of claim 7 wherein:

each spatial stream of the one or more respective spatial streams of the plurality of antennae has associated thereto a respective one or more singular values representing a respective one or more channel coefficients; and at least one of the respective one or more singular values of the main spatial stream is a largest singular value among the respective one or more singular values of the one or more respective spatial streams of the plurality of antennae.

16. The method of claim 1 wherein:

the one or more UEQM parameters is a first grouping of one or more UEQM parameters;

the control sub-field further includes control information having an additional plurality of bits;

and the method further comprises:

indicating, by the additional plurality of bits of the control information, a second grouping of one or more UEQM parameters from among the plurality of UEQM parameters, the second grouping of one or more UEQM parameters defining the respective modulation scheme for the at least one spatial stream of the plurality of antennae by a pre-determined index.

17. The method of claim 16 further comprising:

selecting, from a directory of indices, the pre-determined index in accordance with a coding rate and a number of spatial streams corresponding to the one or more respective spatial streams of the plurality of antennae.

18. The method of claim 16 wherein the second grouping of one or more UEQM parameters defines the respective modulation scheme for the at least one spatial stream of the plurality of antennae by the pre-determined index and a number of spatial streams corresponding to the one or more respective spatial streams of the plurality of antennae.

19. The method of claim 1 wherein each of the one or more UEQM parameters defines the respective modulation scheme for a respective one spatial stream of the one or more respective spatial streams of the plurality of antennae.

20. An electronic device comprising a processor coupled to tangible, non-transitory processor-readable memory having stored thereon instructions to be executed by the processor to implement a method comprising:

preparing, for a physical protocol data unit (PPDU), a medium access control (MAC) header including a high-throughput (HT) control field having a control sub-field, the control sub-field including a control identifier (ID);

setting the control ID to define, in the MAC header, a HT control (HTC) extension having a plurality of bits;

indicating, by a set of bits of the plurality of bits, an HTC extension type;

and indicating, by one or more groups of bits of the plurality of bits, one or more unequal modulation (UEQM) parameters in accordance with the HTC extension type, each of the one or more groups of bits of the plurality of bits being distinct from each other and from the set of bits, each of the one or more UEQM parameters defining a respective modulation scheme for at least one spatial stream of one or more respective spatial streams of each of a plurality of antennae configured to transmit the PPDU.

* * * * *